March 23, 1943.                F. W. DITTUS ET AL                2,314,776
                                PIPE EXPANSION JOINT
                                Filed Feb. 24, 1942

INVENTORS
Frederick W. Dittus
William H. Spaulding
Peter J. Bertoglio

By  *JHAdams*
            ATTORNEY

Patented Mar. 23, 1943

2,314,776

UNITED STATES PATENT OFFICE 2,314,776

PIPE EXPANSION JOINT

Frederick W. Dittus, Berkeley, Peter J. Bertoglio, Alameda, and William H. Spaulding, Berkeley, Calif., assignors to Standard Oil Company of California, San Francisco, Calif., a corporation of Delaware Application February 24, 1942, Serial No. 432,098

6 Claims. (Cl. 285—90)

This invention relates to expansion joints adapted to compensate for changes in length of steam, high temperature gas and liquid and other pipe lines where such changes in length are produced by temperature variations, and particularly refers to an arrangement which will equalize the forces tending to elongate the structure due to the pressure difference between the inside and the outside of the expansion joint acting upon the cross-sectional area of the latter.

Heretofore expansion joints which have involved expansible and collapsible tubular means or bellows to provide the necessary flexibility have required substantial and expansive anchorages to receive the unbalanced thrust due to the difference between the pressure inside and outside of the line exerted over its projected cross-sectional area.

This invention comprehends broadly an arrangement of two expansible and collapsible tubular means which are positioned between abutments so connected to the pipe line and to each other that the forces due to pressure are accurately and completely balanced for any position of expansion or contraction of the structure.

It is an object of this invention to provide an improved form of pipe expansion joint which will not require anchorages or other securing means in the conduit in which it is intended to be placed, particularly when that conduit is of large diameter or carries fluid under high pressure with respect to atmospheric pressure.

Another object is to provide a so-called bellows type pipe expansion joint in which the forces tending to elongate the joint are compensated by means responsive to the pressure differential between the fluid inside and outside of the joint.

Another object is to provide a simple and economical form of self-equalizing expansion joint for pipe lines and the like which requires no separate anchorage or thrust-absorbing structures.

These and other objects and advantages of this invention will be further apparent from the following description and from the accompanying drawing which forms a part of this specification and illustrates a preferred embodiment of this invention. In the drawing.

Figure 1:
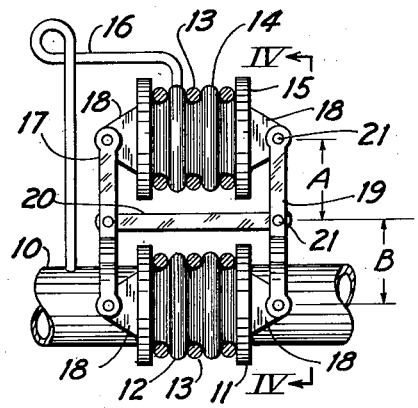
Figure 1 is a diagrammatic elevational view of a simple form of this invention in which the balancing bellows is separately mounted from that positioned in the conduit.

Referring to the drawing, and particularly to Figure 1, reference numeral 10 illustrates a conduit adapted to carry a fluid under high pressure and possibly under high or variable temperature, and between the ends of which a certain degree of expansion or contraction must be accommodated. Reference numeral 11 designates a pair of abutments or flanges between which is an expansible and collapsible tubular element 12, for example, a bellows of thin metal circumferentially corrugated, as indicated. Desirably, but not necessarily, the bursting strength of bellows 12 may be increased by circumferential rings 13 or similiar means which lie within the corrugations of the bellows.

A second expansible and collapsible tubular means or bellows 14 is positioned adjacent conduit 10 and is provided with abutments or flanges 15. Bellows 14 may similarly be provided with reinforcing rings 13. A flexible pressure connection 16 leads from conduit 10 to the second bellows 14, which latter, in this example, is substantially the same effective area and diameter as the first named bellows 12, thus setting up equal longitudinal or axial expansion or contraction forces within both expansible elements due to the differential in pressure between the fluid inside of conduit 10 and that outside of the latter.

Figure 2:
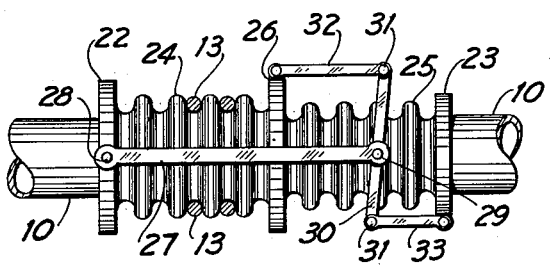
Figure 2 is a diagrammatic side elevational view of an alternative form in which both bellows are mounted in the conduit.
Figure 4:
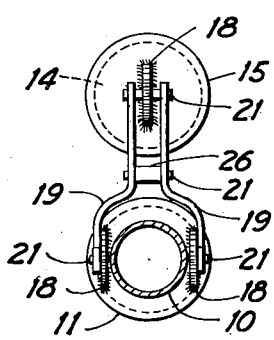
Figure 4 is a transverse vertical sectional view on line IV—IV of the embodiment of Figure 1.

In order to oppose these two forces and thus equalize the expansion or contraction forces, a linkage generally designated 17 is adapted to connect abutments 11 and 15. In the diagrammatic illustration of Figures 1 and 4, lugs 18 are provided on abutments 11 and 15 and are interconnected by means of cross-members 19 and strut 20. Desirably, but not necessarily, all of these connections are pivotally connected as by pins 21. In the example shown, where bellows 12 and 14 are of equal effective area, strut 20 is substantially in the center of cross-members 19 so that distance A is equal to distance B. Under certain circumstances it may be desirable to have the effective diameters and areas of elements 12 and 14 unequal, in which case the respective proportions of A and B would bear the proper mathematical relationship, apparent to anyone skilled in this art.

Where both the expansible and collapsible means are to be mounted in the conduit or coaxial therewith, as in the example of Figure 2, one of the two means must be larger in diameter than the other, for reasons which will be apparent. In the example of Figure 2, reference numeral 10 designates the conduit as before. End flanges or abutments 22 and 23 are provided in conduit 10 and are connected, respectively, to the larger diameter bellows 24 and the smaller diameter bellows 25. Between these bellows and connected to each one of them is an intermediate flange or abutment 26. As in the case of the embodiment of Figure 1, bellows 24 and 25 may be provided with reinforcing rings 13 or other strengthening devices.

In this example, the effective area of bellows 24 is chosen to be twice that of 25 for a reason which will be further apparent below. End abutments 22 and 23 and intermediate abutment 26 are connected by struts and cross-members which utilize the difference in expansion and contraction force exerted by bellows 24 and 25, respectively, on their corresponding abutments due to the difference in fluid pressure between the inside and outside of conduit 10. Although but one set of struts and cross-members are shown in Figure 2, it is to be understood that, for purposes of symmetry, a similar arrangement is placed upon the opposite side of this structure. Consequently, only one side of these members will be described. A strut 27 is pivoted as at 28 to end abutment 22 and extends substantially axially beyond intermediate abutment 26 to a slider 29 which is selectively movable along a transverse cross-member 30 or may be fixed thereto. The ends of member 30 are pivoted at 31 to axial struts 32 and 33 respectively. Strut 32 is pivoted to intermediate abutment 26 and strut 33 is similarly pivoted to end abutment 23, the distance of said pivoted connections preferably, but not being necessarily, substantially equal on each side of the axis of conduit 10 and bellows 25.

It will be obvious from an analysis of the forces acting upon the large bellows 24 and the small bellows 25 that a position of slider 29 may be found which will permit end abutments 22 and 23 to be moved closer together or separated under the influence of forces such as temperature changes in conduit 10, but which will equalize expansion and contraction forces in conduit 10 due to the difference in pressure between the fluid inside and outside of conduit 10 acting upon the projected area of that conduit.

In the example shown, the effective area of bellows 24 is substantially twice that of bellows 25 so that slider 29 will be approximately in the center of cross-member 30. If, however, it becomes desirable to have the effective area of bellows 24 bear a different relationship to the effective area of bellows 25, for example, three times or four times its effective area, slider 29 would assume correspondingly different positions along member 30, in these cases being respectively one-third and one-quarter the distance between strut 32 and strut 33.

Figure 3:
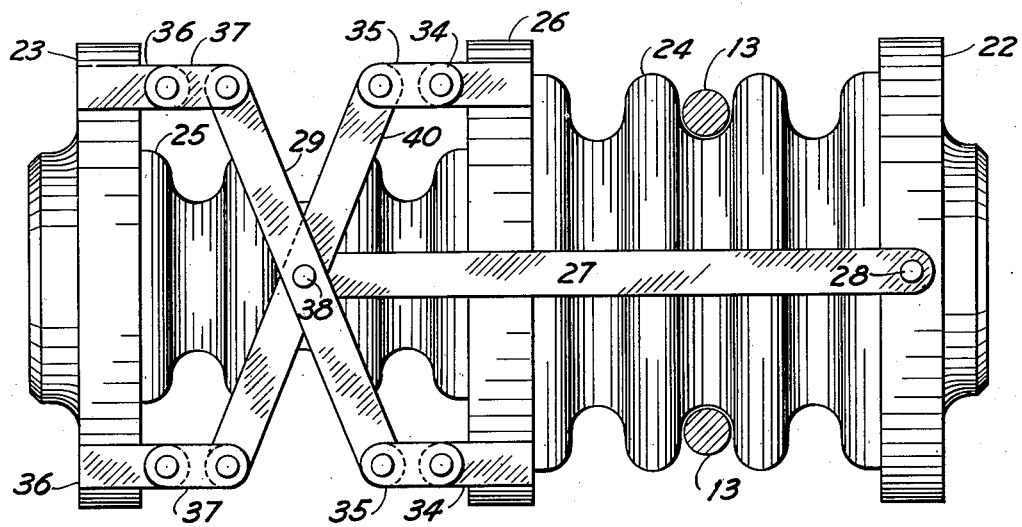
Figure 3 is a vertical side elevational view of an embodiment similar to that of Figure 2 but with a more convenient linkage arrangement.

The embodiment of Figure 3 is essentially similar to that of Figure 2 in that both the large bellows 24 and the small bellows 25 are coaxial and mounted between end flanges or abutments 22 and 23, which latter may be welded or otherwise connected into a conduit (not shown).

Intermediate abutment 26, in this example, is provided with lugs 34 which are pivotally connected to links 35. Similar lugs 36 and links 37 are provided upon end abutment 23, which is that adjacent the smaller of the two bellows 24 and 25. Strut 27 is similarly pivoted at 28 on abutment 22 and extends to a point beyond the intermediate abutment 26 where it is pivotally connected as at 38 to the center of crossed-members 39 and 40 which are in turn pivotally connected at their outer ends to links 35 and 37. This arrangement permits relative motion between each of abutments 22, 23 and 26 and, where bellows 24 is made with substantially twice the effective area of bellows 25, has been found to be a desirable form of construction. Desirably, but not necessarily, abutments 23 and 26 are of square configuration to facilitate the attachment of lugs 34 and 36.

It will be found that the expansion and contraction of the larger diameter bellows will be less than that of the smaller diameter bellows and inversely proportional to the ratios of their respective effective areas. In other words, if bellows 24 of Figures 2 or 3 deflects approximately one inch with a given temperature change in conduit 10, bellows 25, of half the effective area, will be found to deflect approximately twice that distance, or two inches. This should be considered in the application of this invention to specific problems involving elongation and contraction of pipe lines due to temperature changes and the like.

It is believed that the essential features of this invention reside in the provision of first and second expansible and collapsible tubular means or bellows, each responsive to the fluid pressure within the conduit whose expansion and contraction is to be accommodated, with linkages or mechanical means connecting the ends of the bellows to balance the forces exerted on the separate bellows by the pressure differential existing between the inside and outside of the conduit, these linkages or means being so constructed and arranged as to permit longitudinal expansion and contraction of these tubular means which are placed within the conduit. Although specific examples of this invention have been illustrated and described, it is obvious that numerous modifications could be made without departing from the invention and all such changes that come within the scope of the appended claims are embraced thereby.

We claim:

1. An expansion joint comprising aligned abutments adapted to be connected in a conduit carrying fluid under pressure, a first expansible and collapsible tubular means connecting said abutments and subject to the internal fluid pressure in said conduit, a second expansible and collapsible tubular means subject to said internal fluid pressure, abutments at the ends of said second tubular means and means connecting said abutments to balance the elongating force in said conduit due to the difference between the internal and external fluid pressure, said means being so constructed and arranged as to permit longitudinal expansion and contraction of said tubular means.

2. An expansion joint according to claim 1 in which said first and second tubular means are coaxial.

3. An expansion joint according to claim 1 in which said first and said second tubular means are coaxial and one of said tubular means is of larger diameter than the other.

4. An expansion joint comprising end abutments adapted to be connected in a conduit carrying fluid under increased or reduced pressure, an intermediate abutment, an expansible and collapsible tubular means connecting one of said end abutments to said intermediate abutment, a second expansible and collapsible tubular means of larger diameter connecting the other of said end abutments to said intermediate abutment, and an expansible and collapsible linkage interconnecting said three abutments, the respective diameters of said tubular means and the structure of said linkage being proportioned to balance the elongating or contracting force in said conduit due to the difference between the internal and external pressure thereon.

5. An expansion joint according to claim 4 in which said linkage comprises a first pivoted strut extending substantially axially from the end abutment for the larger diameter tubular means to a point beyond the intermediate abutment, a second strut extending similarly from the intermediate abutment, a cross-member pivotally connecting the end of said second strut to the remaining abutment and means adjustably and pivotally connecting the end of said first strut to said cross-member at an intermediate point thereon.

6. An expansion joint according to claim 4 in which said larger diameter tubular means has substantially twice the effective area as said smaller tubular means and in which said linkage comprises a first pivoted strut extending substantially axially from the end abutment for the larger diameter tubular means to a point beyond the intermediate abutment, and a pair of crossed members pivotally connecting said intermediate and said remaining abutments, said first strut being pivotally connected to said crossed-members at their point of intersection.

FREDERICK W. DITTUS.
WILLIAM H. SPAULDING.
PETER J. BERTOGLIO.